(12) United States Patent
Wang et al.

(10) Patent No.: US 10,146,240 B1
(45) Date of Patent: Dec. 4, 2018

(54) HIGH CURRENT LDO VOLTAGE REGULATOR WITH DYNAMIC PRE-REGULATOR

(71) Applicant: Apple Inc., Cupertino, CA (US)

(72) Inventors: Ruopeng Wang, San Jose, CA (US);
Dashun Xue, Austin, TX (US);
Jiandong Jiang, Saratoga, CA (US);
Jay B. Fletcher, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/886,700

(22) Filed: Feb. 1, 2018

(51) Int. Cl.
*G05F 3/16* (2006.01)
*G05F 1/575* (2006.01)
*H02M 7/10* (2006.01)
*G05F 3/24* (2006.01)

(52) U.S. Cl.
CPC .............. *G05F 1/575* (2013.01); *G05F 3/242* (2013.01); *H02M 7/10* (2013.01)

(58) Field of Classification Search
CPC ................................. G05F 3/241; H02M 7/10
USPC .................................................. 327/539–544
See application file for complete search history.

(56) References Cited

U.S. PATENT DOCUMENTS

| 5,867,015 | A | * | 2/1999 | Corsi ..................... G05F 3/242 323/316 |
| 6,225,857 | B1 | * | 5/2001 | Brokaw .................. G05F 1/575 327/540 |
| 6,285,246 | B1 | * | 9/2001 | Basu ....................... G05F 1/575 323/316 |
| 8,514,010 | B2 | | 8/2013 | Nagata |
| 8,610,411 | B2 | | 12/2013 | Smith et al. |
| 8,917,069 | B2 | | 12/2014 | Howes et al. |
| 9,104,222 | B2 | | 8/2015 | Pigott |
| 9,383,618 | B2 | | 7/2016 | Luff |
| 2007/0046474 | A1 | * | 3/2007 | Balachandran .... G06K 19/0701 340/572.7 |
| 2009/0273237 | A1 | * | 11/2009 | Inoue ..................... G05F 1/575 307/10.1 |

FOREIGN PATENT DOCUMENTS

CN 102830741 12/2012

\* cited by examiner

*Primary Examiner* — Dinh T Le
(74) *Attorney, Agent, or Firm* — Meyertons, Hood, Kivlin, Kowert & Goetzel, P.C.; Erik A. Heter

(57) ABSTRACT

A voltage regulator having a pre-regulator circuit is disclosed. A low dropout (LDO) voltage regulator includes an amplifier circuit, a current buffer circuit, and a pre-regulator circuit. The current buffer circuit includes a transistor having a gate terminal coupled to the amplifier output. The current buffer provides a current based at least in part on the output signal generated by the amplifier. The pre-regulator circuit is coupled to provide a dynamic supply voltage to the current buffer. They dynamic supply voltage depends at least in part on a fixed supply voltage provided thereto, as well as the output voltage provided by the LDO voltage regulator.

20 Claims, 14 Drawing Sheets

HIGH CURRENT LDO VOLTAGE REGULATOR WITH DYNAMIC PRE-REGULATOR

BACKGROUND

Technical Field

This disclosure is directed to electronic circuits, and more particularly, to voltage regulator circuits.

Description of the Related Art

Voltage regulators are commonly used in a wide variety of circuits in order to provide a desired voltage to particular circuits. To this end, a wide variety of voltage regulator circuits are available to suit various applications. Linear voltage regulators are used in a number of different applications in which the available supply voltages exceed an appropriate value for the circuitry to be powered. Accordingly, linear voltage regulators may output a voltage that is less than the received supply voltage.

Some linear voltage regulators may be implemented as stages. Each of the stages may contribute to generating the output voltage based on supplied input voltage (e.g. from the external source). The stages may be coupled to one another, with capacitors coupled to the output of each stage. These capacitors may stabilize the voltage that is output by each of the stages. In voltage regulators implemented on an integrated circuit (IC), the output of a given voltage regulator stage may be provided with an external connection for coupling to a capacitor implemented external to the IC (e.g., on a printed circuit board, or PCB).

SUMMARY

A voltage regulator having a pre-regulator circuit is disclosed. In one embodiment, a low dropout (LDO) voltage regulator includes an amplifier circuit, a current buffer circuit, and a pre-regulator circuit. The current buffer circuit includes a transistor having a gate terminal coupled to the amplifier output. The current buffer provides a current based at least in part on the output signal generated by the amplifier. The pre-regulator circuit is coupled to provide a dynamic supply voltage to the current buffer. The dynamic supply voltage depends at least in part on a fixed supply voltage provided thereto, as well as the output voltage provided by the LDO voltage regulator.

In one embodiment, the pre-regulator circuit includes at least one current buffer and a driver circuit. The driver circuit is configured to generate the dynamic supply voltage based on the current provided current buffer. The current generated by the current buffer is, in turn, dependent on the output voltage provided by the LDO voltage regulator.

Various embodiments of a voltage regulator utilizing a pre-regulator circuit are also disclosed.

BRIEF DESCRIPTION OF THE DRAWINGS

The following detailed description makes reference to the accompanying drawings, which are now briefly described.

Figure 1:
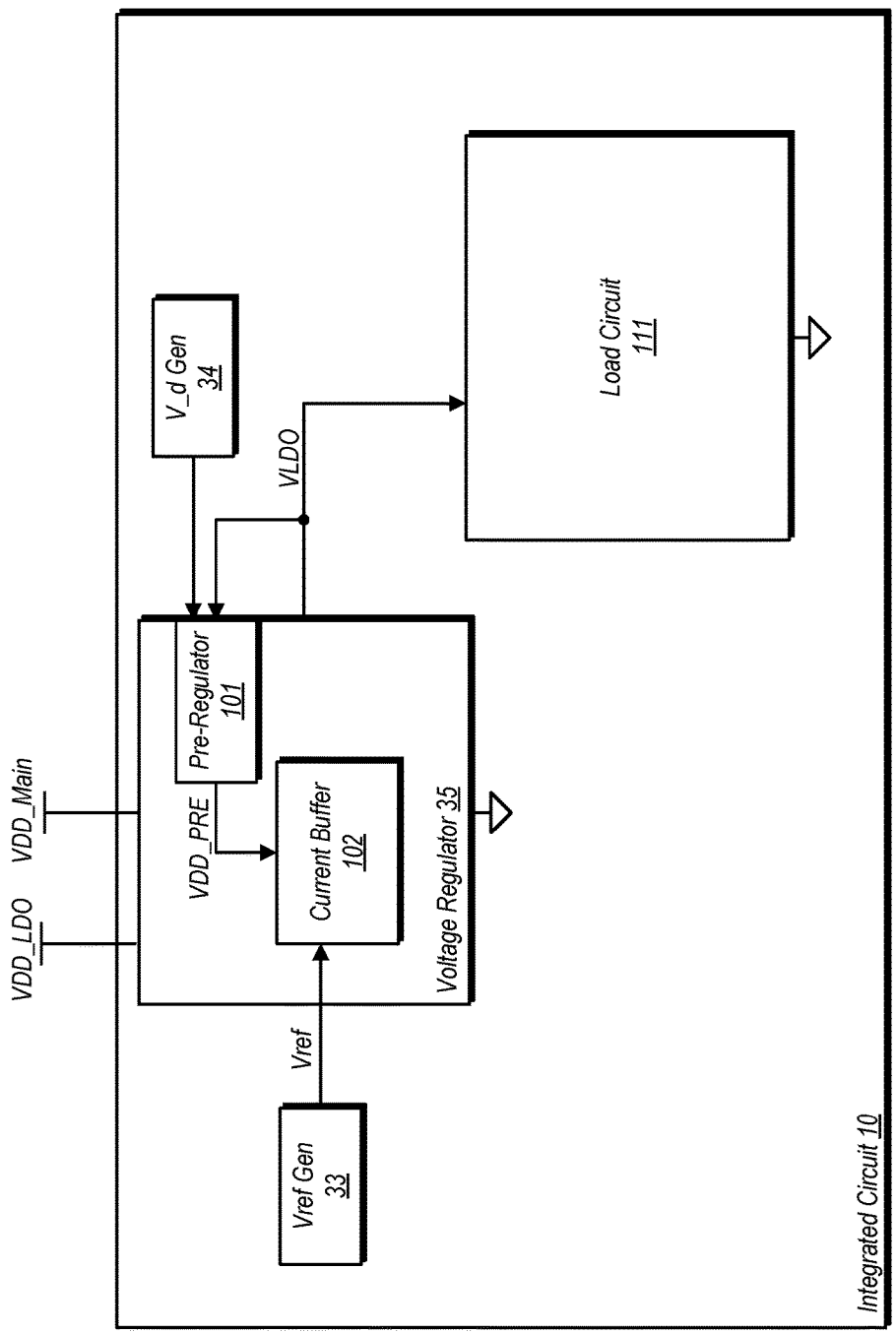
FIG. 1 is a block diagram of one embodiment of an integrated circuit (IC).

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Integrated Circuit

Turning now to FIG. 1, a block diagram of one embodiment of an integrated circuit (IC) 10 is shown. It is noted that this embodiment is shown here for illustrative purposes, but is not intended to be limiting to any particular type of IC.

IC 10 in the illustrated example includes a load circuit 111, which is a functional circuit block that carries out various functions of the circuit. Other instances of load circuit 111 (or similar circuits) may be present in various embodiments. Load circuit 111 may include digital circuitry, analog circuitry, and/or mixed signal circuitry.

Load circuit 111 in the embodiment shown is coupled to receive an operating voltage, VLDO, from voltage regulator 35. In various embodiments, voltage regulator 35 is a low dropout (LDO) voltage regulator, as is discussed below. Voltage regulator 35 is coupled to receive power from a source external to IC 10, shown here as VDD_Main. Another external source, VDD_LDO may be used to provide a supply voltage to a low voltage pass device within voltage regulator 35, although embodiments in which this voltage is generated on-chip are possible and contemplated. Additionally, voltage regulator 35 is coupled to receive a reference voltage (Vref) from reference voltage generation circuit 33 and another voltage, V_d, from V_d generation circuit 34. These voltages may be, in some embodiments, fixed voltages that are used by certain circuits within voltage regulator 35. Additional voltage generation circuits may also be present, although they are not shown here for the sake of simplicity.

Circuitry within voltage regulator 35 includes a current buffer 102 and a pre-regulator 101. The pre-regulator 101 is configured to generate a dynamic supply voltage, VDD_PRE, which is the operating voltage used by current buffer 102. In various embodiments, as will be discussed below, pre-regulator 101 is configured to generate this dynamic supply voltage based on the output voltage of voltage regulator 35, VLDO, as well as the external supply voltage, VDD_Main. The current buffer 102, along with other circuitry within voltage regulator 35, generates the output voltage VLDO.

The use of the dynamic pre-regulator 101 may provide various advantages in operation of the various embodiments of voltage regulator 35. For example, the utilization of pre-regulator 101 may enable the use of smaller devices within voltage regulator 35 (e.g., using a low voltage device as the pass transistor in the voltage regulator), thereby resulting in area savings. In particular, the use of the pre-regulator may prevent damage to the low voltage devices.

Various Embodiments of a Dynamic Pre-Regulator

Figure 2:
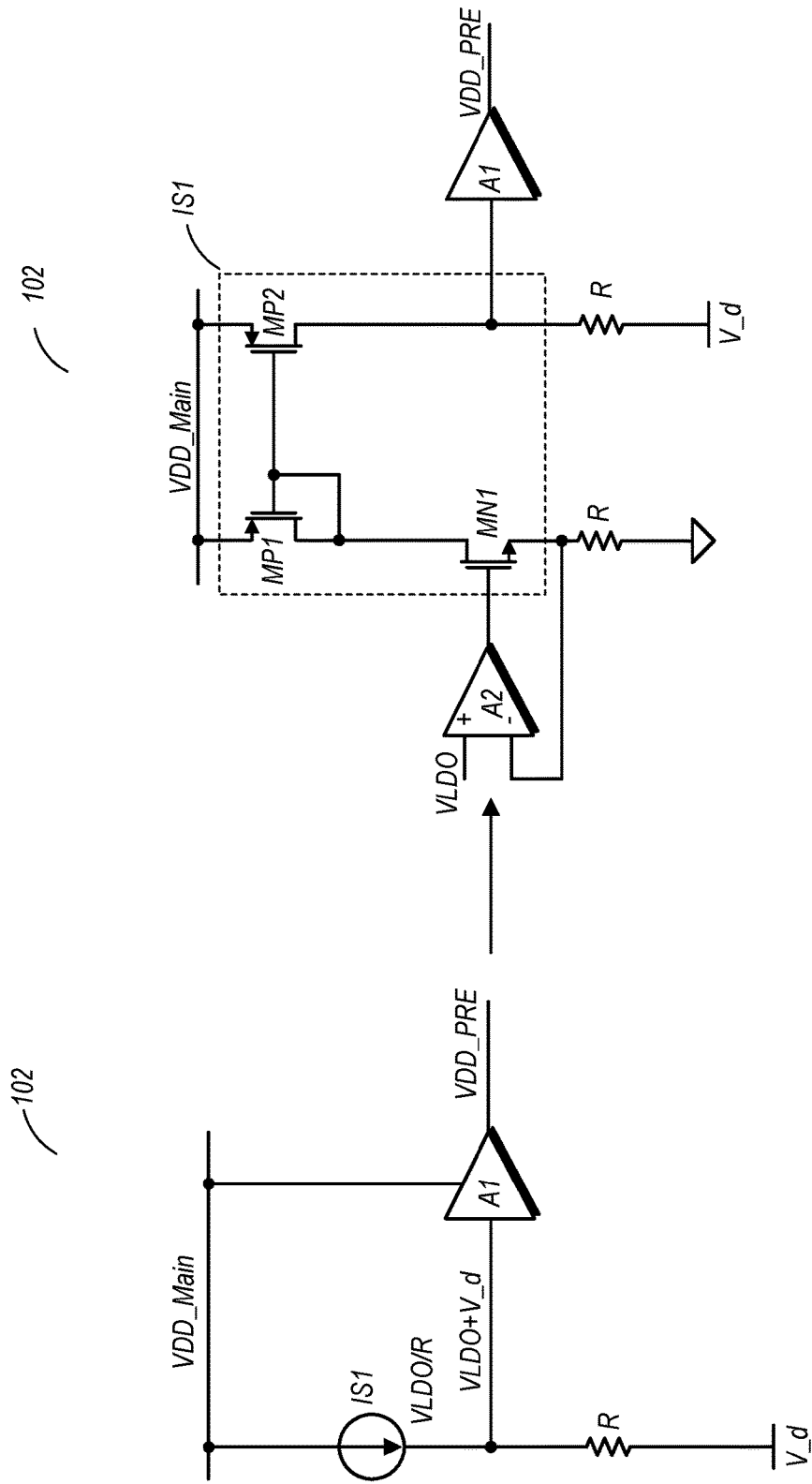
FIG. 2 is a schematic diagram of one embodiment of a pre-regulator circuit used with various embodiments of a voltage regulator.
Figure 3:
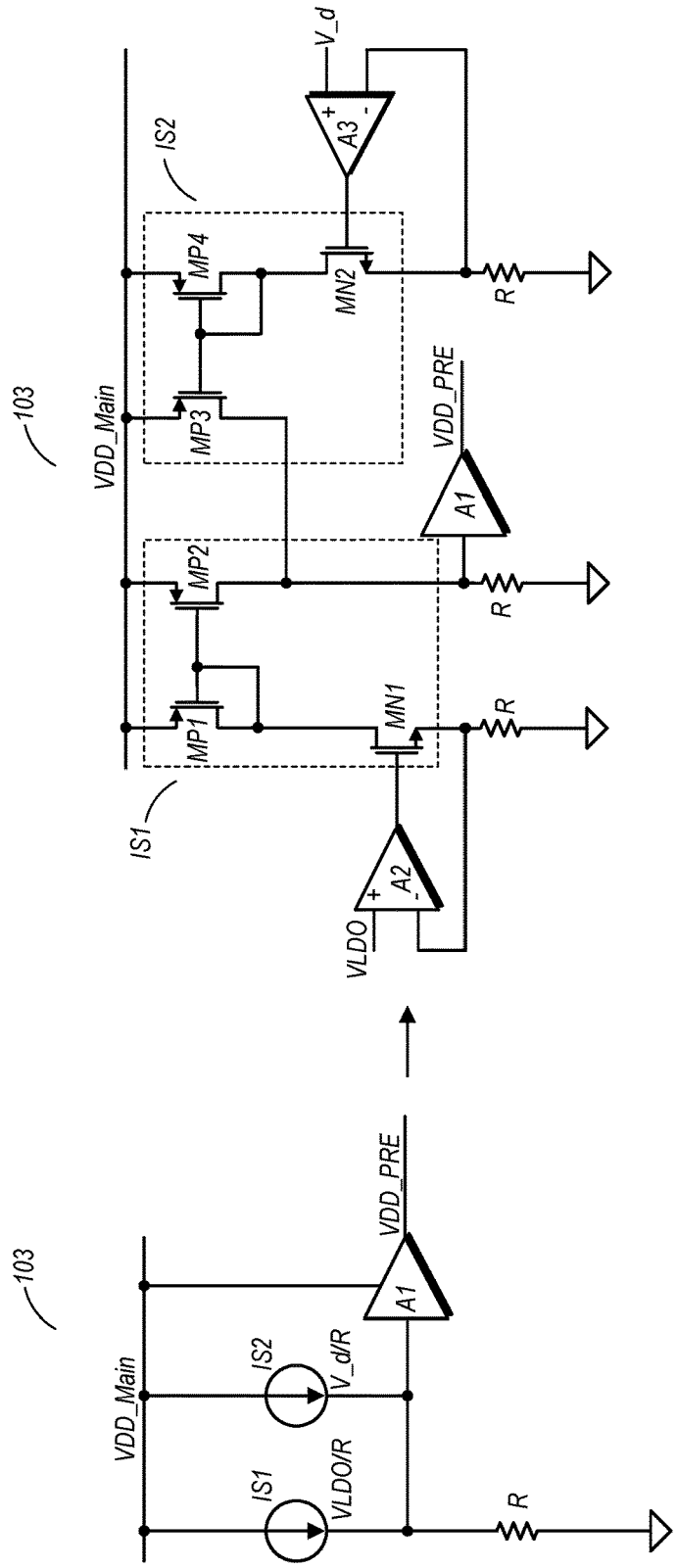
FIG. 3 is a schematic diagram of another embodiment of a pre-regulator circuit.
Figure 4:
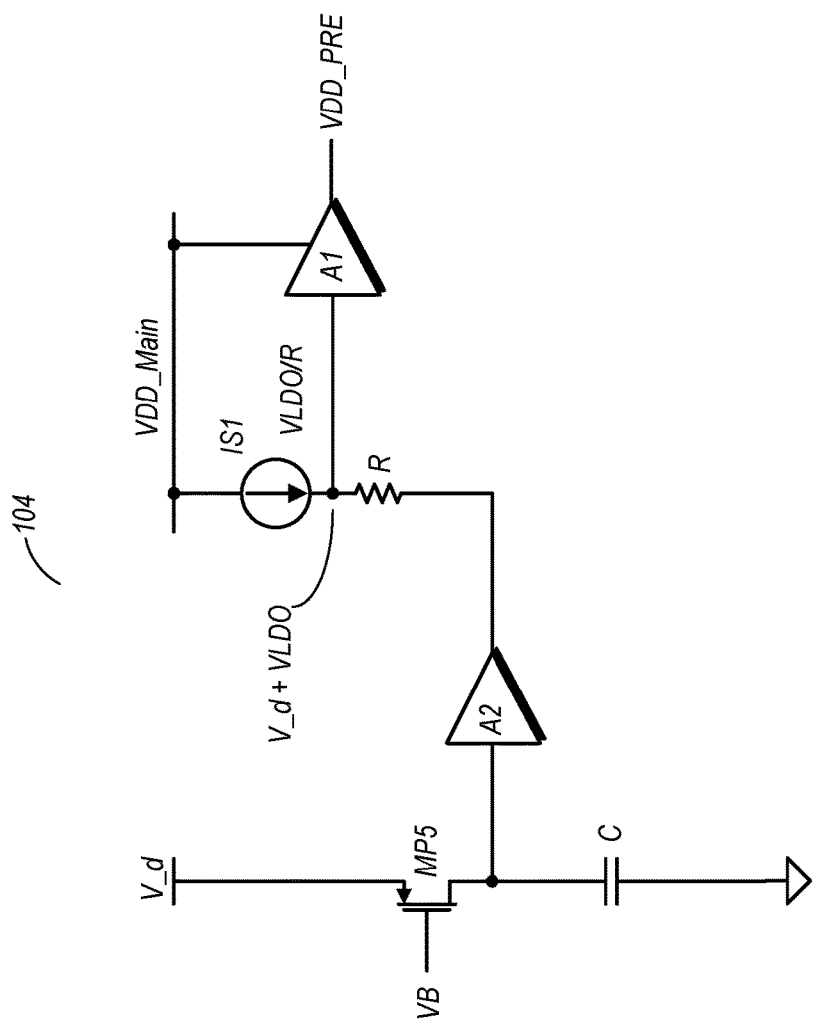
FIG. 4 is a schematic diagram of another embodiment of a pre-regulator circuit.

FIGS. 2, 3, and 4 illustrate various embodiments of a pre-regulator circuit. Any of the embodiments shown in these figures may be utilized at pre-regulator 101 as shown in FIG. 1 and any of the subsequently discussed embodiments of a voltage regulator.

It is noted that in the various circuit embodiments shown in the drawings throughout this disclosure, PMOS transistors are designated with "MP" (e.g., MP1) while NMOS transistors are designated with "MN" (e.g., MN1). The lone exception is with regard to the pass transistor in each of the various voltage regulator embodiments, which is uniformly designated as "M_Pass".

FIG. 2 schematically illustrates one embodiment of a pre-regulator circuit. On the left-hand portion of the drawing is a simplified schematic, while the right-hand portion illustrates a more detailed version of the same. Pre-regulator circuit 102, as shown in the left-hand portion, includes a current source IS1, a resistance R (which may be implemented in any suitable manner), and an amplifier A1 (which is a single-ended amplifier in this embodiment). The resistance R in the embodiment shown is coupled between current source IS1 and a voltage source V_d. The junction between current source IS1 and resistance R is coupled to the input of amplifier A1. The resistance R may be implemented by any suitable mechanism, including (but not limited to) a single, discrete resistor. The voltage input to amplifier A1 in the embodiment shown is VLDO+V_d, with VLDO being the output voltage provided by the voltage regulator in which pre-regulator circuit 102 is to be implemented. The output voltage provided by pre-regulator circuit 102, VDD_PRE from amplifier A1, is the dynamic supply voltage used by the various embodiments of a voltage regulator as discussed herein.

In the detailed implementation shown in the right hand portion of FIG. 2, current source IS1 is implemented using a current mirror that includes PMOS transistors MP1 and MP2. In particular, the current through MP1 is mirrored through MP2. The right leg of the current mirror is further coupled to resistance R, which is coupled between the drain terminal of MP2 and voltage source V_d. The left leg of the current mirror is coupled to NMOS transistor MN1, the source terminal of which is coupled to another resistance R. The resistance R, which is further coupled to a ground node (or more generally, reference node) may be implemented using any suitable mechanism, similar to the resistance coupled to the right leg of the current mirror.

The gate terminal of MN1 in the embodiment shown is coupled to amplifier A2, which includes an inverting input and a non-inverting input. The inverting input is coupled to receive a feedback signal from the junction of resistance R and the source terminal of MN1. The non-inverting input is coupled to receive the output voltage of the voltage regulator, VLDO. Accordingly, amplifier A2 in the embodiment shown will drive an output signal to the gate of MN1 such that the current through the left leg is equal to VLDO/R. This current is then mirrored to the right leg of the current mirror of ratio one-to-one, thereby causing a voltage of VLDO+V_D to be input into amplifier A1.

FIG. 3 is another embodiment of a pre-regulator circuit. In the embodiment shown, pre-regulator 103 includes two current sources, IS1 and IS2. The current that is sourced by IS1 is equivalent to VLDO/R, while the current sourced by IS2 is equivalent to V_d/R. The output from each of these current sources is coupled to the input of amplifier A1. As with the embodiment shown in FIG. 2, the voltage at the input to amplifier A1 is VLDO+V_d. However, the circuit topology by which this input voltage is generated is different, as shown on the right-hand side of FIG. 3.

Current source IS1 in the embodiment shown is implemented with PMOS transistors MP1 and MP2, while current source IS2 is implemented with MP3 and MP4. The drain terminals of MP2 and MP3 are coupled to one another, as well as being coupled to the input of amplifier A1, which produces the dynamic supply voltage VDD_PRE. In the circuit as shown, the current through MP1 is mirrored by MP2, while the current through MP4 is mirrored by MP3. Since the drain terminals of MP2 and MP3 are coupled to one another, the middle leg of the circuit that is coupled to the input of A1 combines both of the mirrored currents.

Amplifier A2 in the embodiment shown is coupled to receive the voltage VLDO on its non-inverting input, and generates the current VLDO/R in largely the same manner as discussed above for the embodiment of FIG. 2. Amplifier A3 is coupled to current source IS2 in a similar manner, but is coupled to receive the voltage V_d on its non-inverting input. Thus, the current sourced by IS2 is V_d/R. With both of these current combined in the middle leg of the circuit, the input voltage to amplifier A1 is VLDO+V_d. However, in contrast to the circuit shown in FIG. 2, each of the three resistances R is coupled to ground. Thus, the currents generated by current sources IS1 and IS2 flow into ground in this particular embodiment.

FIG. 4 illustrates another embodiment of a pre-regulator circuit. Pre-regulator 104 in this embodiment utilizes soft-start circuitry in the leg on the left-hand side of the drawing, which includes PMOS transistor MP5 and capacitor C. Such soft-start circuitry may be present in many embodiments of an LDO voltage regulator, and thus may be re-used as part of the pre-regulator circuit 104. The source terminal of MP5 in this embodiment is coupled to an analog voltage supply, V_d. The gate terminal of MP5 in this embodiment may be coupled to bias circuitry (not shown). More particularly, the gate terminal may be coupled to a current mirror in the bias circuitry. As a result, a fixed current is provided to capacitor C, the other terminal of which is coupled to ground (or more generally, a reference node). This arrangement results in a circuit in which the current from the bias circuitry is mirrored through MP5.

The output of amplifier A2 (which is a unity gain amplifier in this embodiment) is coupled to a second leg of the circuit, which includes current source IS1. The current through this current source is VLDO/R, where VLDO is the output voltage of the voltage regulator and which may be provided to, e.g., a device within the current source IS1. Due to the circuit arrangement shown here, the voltage input into amplifier A1 is thus V_d+VLDO, with A1 providing the VDD_PRE output voltage.

LDO Voltage Regulator Embodiments Utilizing a Pre-Regulator Circuit

FIG. 5-FIG. 11 illustrate various voltage regulator embodiments, each of which utilizes a pre-regulator circuit. Any of the pre-regulator circuits discussed above may be implemented in any of the voltage regulators shown in these figures. Each of the embodiments in these figures is an LDO voltage regulator. However, use of the pre-regulator circuit in other types of voltage regulators is possible and contemplated.

Figure 5:
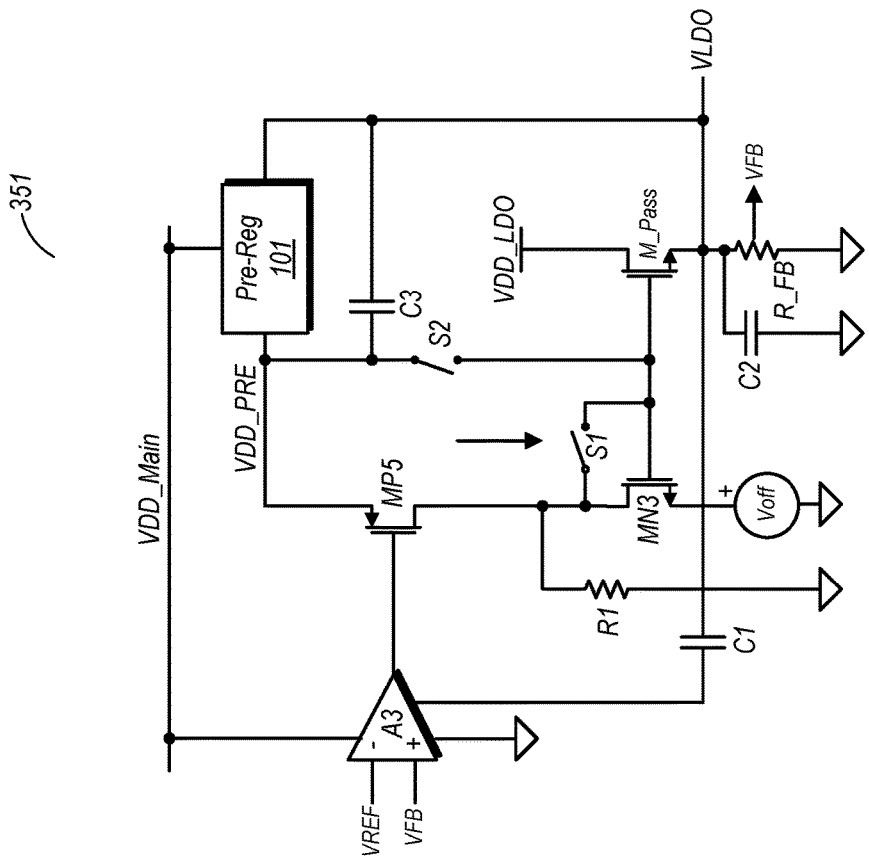
FIG. 5 is a schematic diagram of one embodiment of a voltage regulator having a pre-regulator circuit.

FIG. 5 illustrates a first embodiment of a voltage regulator. In the embodiment shown, voltage regulator 351 includes a current buffer that is implemented using a current mirror of MN3 and NMOS pass transistor, M_Pass, along with PMOS transistor MP5. The current buffer is coupled to receive a dynamic supply voltage, VDD_PRE, from pre-regulator 101, which can be any one of the pre-regulator embodiments discussed above (with appropriate changes made to accommodate that circuitry). Pre-regulator 101 is coupled to receive a supply voltage from VDD_Main, while the drain terminal of M_Pass is coupled to receive the supply voltage VDD_LDO.

Transistor MP5 is coupled to receive the output of an error amplifier, A3. The inverting input of amplifier A3 may be coupled to receive a reference voltage, VREF, while the non-inverting input is coupled to receive a feedback voltage, VFB. During normal operation the control loop of voltage regulator 351 forces VREF and VFB to approximately equal values. The feedback voltage in the embodiment shown is generated between the output node (upon which VLDO is conveyed) and ground via a resistance R_FB. This resistance may be implemented using any suitable mechanism, which may include discrete resistors, a variable resistor, and so forth. An optional filter capacitor, C2, is sown as being coupled in parallel with R_FB in this embodiment.

Figure 12:
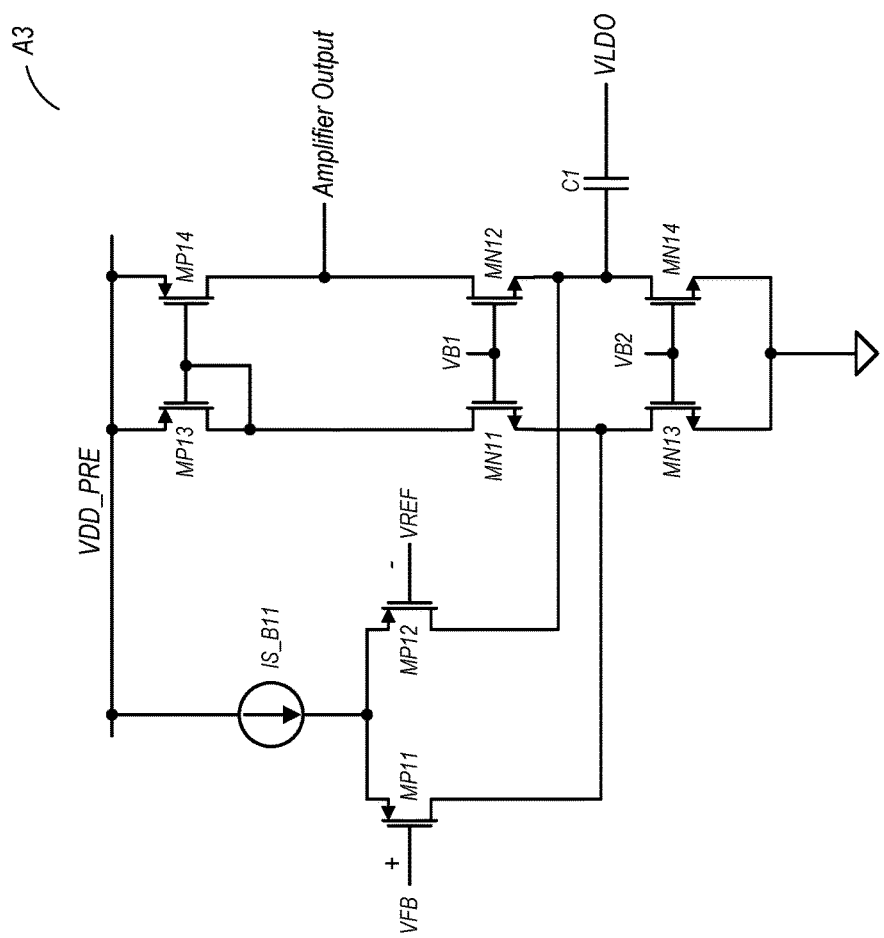
FIG. 12 is a schematic diagram of one embodiment of an amplifier utilized in a voltage regulator having a pre-regulator circuit.

The output signal from error amplifier A3 is driven to the gate terminal of MP5, which affects the current flowing from VDD_PRE into the current mirror. Assuming switch S1 is closed (as during normal operation), the current through MN3 is mirrored to the pass transistor, M_Pass. The source terminal of M_Pass is coupled to the output node, where VLDO is generated. The output node is also coupled to a compensation capacitance, C1, for which the other terminal is coupled to circuitry internal to amplifier A3 (details of this connection are shown in FIG. 12).

As shown in the drawing, this particular embodiment includes switches S1 and S2. During normal operation, S1 is closed (to form the current mirror) while S2 is open. However, during some modes of operation, S1 may be open while S2 is closed, and thus current through M_Pass is directly related to a current value of the dynamic supply voltage, VDD_PRE. When the voltage on the drain terminal of M_Pass is very close to VLDO, voltage regulator 353 may enter dropout mode, and thus switch S1 is opened while switch S2 is closed. It is noted that these switches are optional, and thus not necessarily included in all embodiments.

Voltage regulator 351 in the embodiment shown includes a resistance R1 coupled between the source terminal of MP5 and ground. In some instances, voltage regulator 351 may have a pole set at a high frequency at the source terminal of MP5. The location of this pole can be altered by reducing the impedance at this node through the presence of R1. In some embodiment, resistance R1 may be implemented via multiple resistors in parallel. This may be particularly useful in embodiments having a low output current.

Some embodiments of voltage regulator 351 include a shunt capacitor C3. As shown here, shunt capacitor C3 is coupled between VDD_PRE and VLDO. The presence of the shunt capacitor may aid the tracking ability of pre-regulator 101, and more particularly, the responsiveness of VDD_PRE to changes in VLDO.

Voltage regulator 351 in this embodiment also includes an optional voltage offset source, Voff. This offset voltage may be set at various values, depending on the application and/or whether MN3 is a high or low voltage device.

The use of the dynamic pre-regulator in this (and other) voltage regulator embodiments may ensure that the gate-source voltage of the pass device, M_Pass, is less than or equal to the maximum allowed device voltage. The gate-drain voltage may also be protected since VDD_LDO is greater than or equal to VLDO during operation. The other transistor of the current mirror, MN3, may also be protected in the case in which it is a low voltage device.

Figure 6:
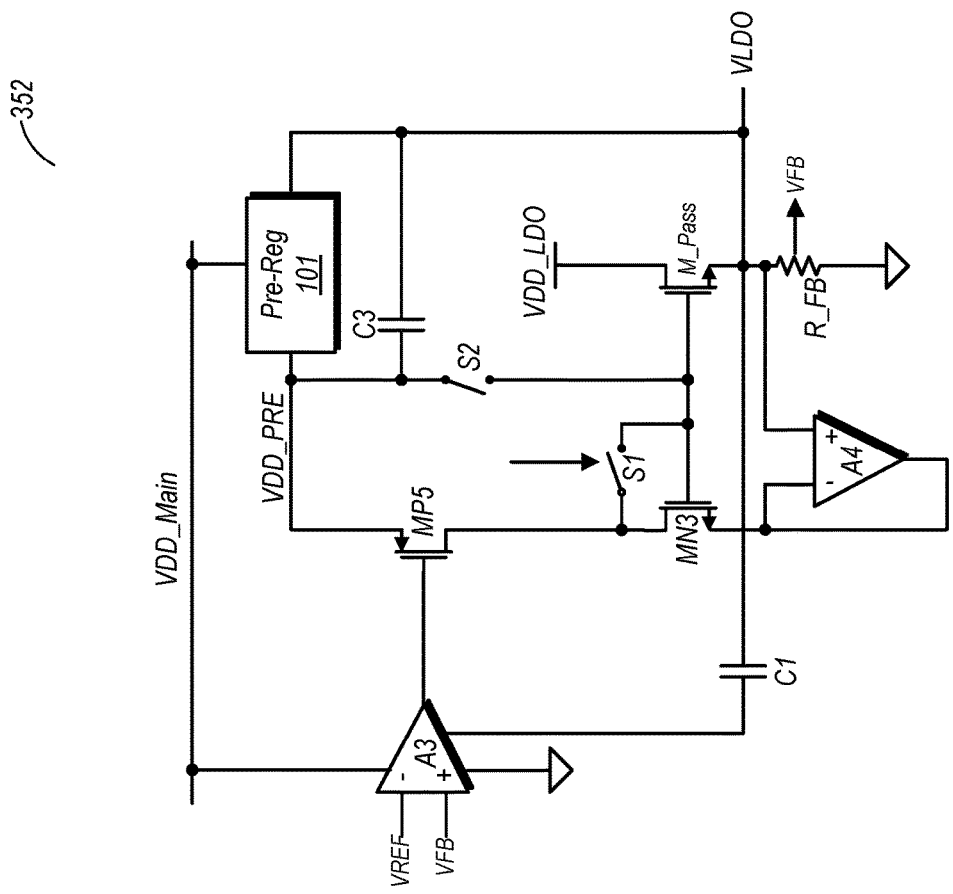
FIG. 6 is a schematic diagram of another embodiment of a voltage regulator having a pre-regulator circuit.

FIG. 6 is another embodiment of an LDO voltage regulator. In the embodiment shown, voltage regulator 352 includes several of the same components as voltage regulator 351 of FIG. 5. In particular, voltage regulator 352 includes a pre-regulator circuit 101 coupled to provide a dynamic supply voltage to a current buffer circuit that includes transistor MP5 and the current mirror implemented with MN3 and M_Pass. The drain terminal of M_Pass is coupled to receive the supply voltage VDD_LDO. Voltage regulator 352 also includes the error amplifier A3 that is coupled to receive the reference voltage VREF and the feedback voltage VFB. A shunt capacitor C3 may be coupled between VLDO and VDD_PRE to enable faster tracking by pre-regulator 101.

In this embodiment, voltage regulator 352 includes amplifier A4, which effectively operates as a high-speed, unity gain buffer. The inverting input of A4 is coupled both to its own output as well as the source terminal of MN3. The non-inverting input of A4 is coupled to the output node upon which the regulator output voltage, VLDO, is provided. Accordingly, the source voltage of MN3 in this embodiment is forced by A4 to a value equal to the output voltage, VLDO. Similarly, the gate source voltage across MN3 is equal to that across the pass transistor, M_Pass. Both MN3 and M_Pass may be low voltage devices in this particular embodiment. As a result, voltage regulator 352 may provide a large output current with a relatively slow response time. Accordingly, this embodiment may be suited for applications in which large output current are desired and operation of the load circuit is such that a rapid response to changing operating conditions is not required or operating conditions are otherwise relatively stable (e.g., a minimal amount of switching of internal circuits).

Figure 7:
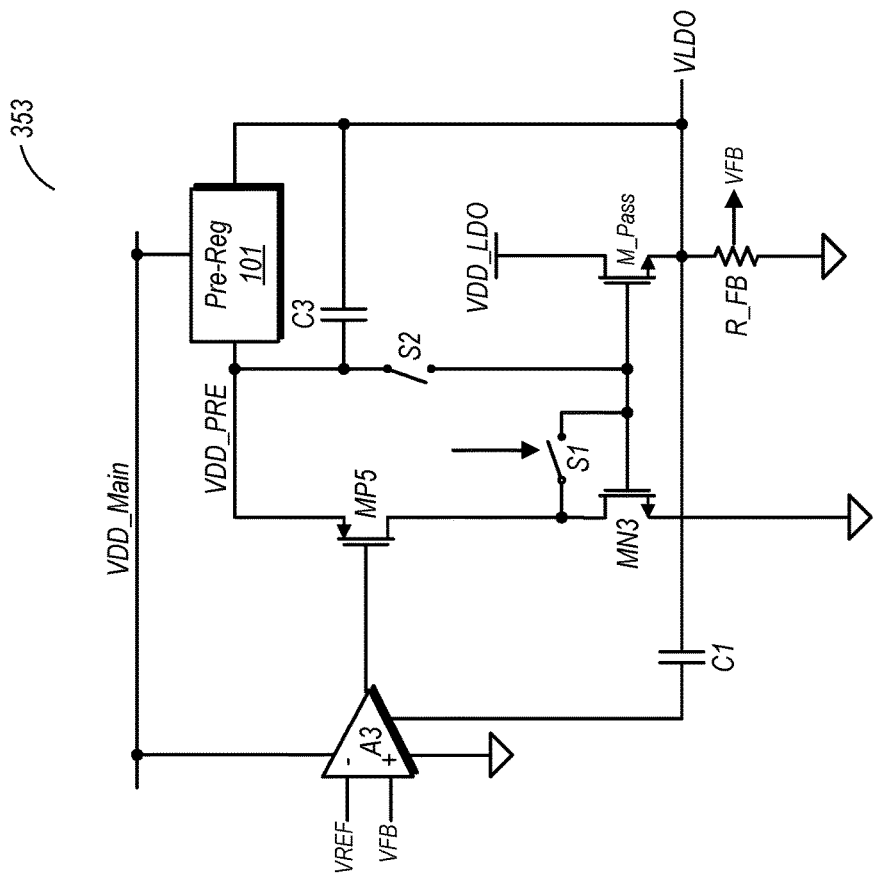
FIG. 7 is a schematic diagram of one embodiment of a voltage regulator having a pre-regulator circuit.

FIG. 7 illustrates another embodiment of a voltage regulator. Voltage regulator 353 as shown here includes the same main components as discussed in the previous two embodiments, including an error amplifier A3, pre-regulator 101 and a current buffer. In this particular example, the source terminal of MN3 is coupled directly to ground. Furthermore, MN3 in this embodiment is a high voltage device. This particular embodiment is designed such that it is more responsive to changes in the load (e.g., changing load current demands). The control loop in this embodiment includes the actual load circuit (not shown in FIG. 7), with the current provided by the current mirror following this loop rather than directly following LDO output current. This design may also enable the use of a smaller compensation capacitor C1.

Figure 8:
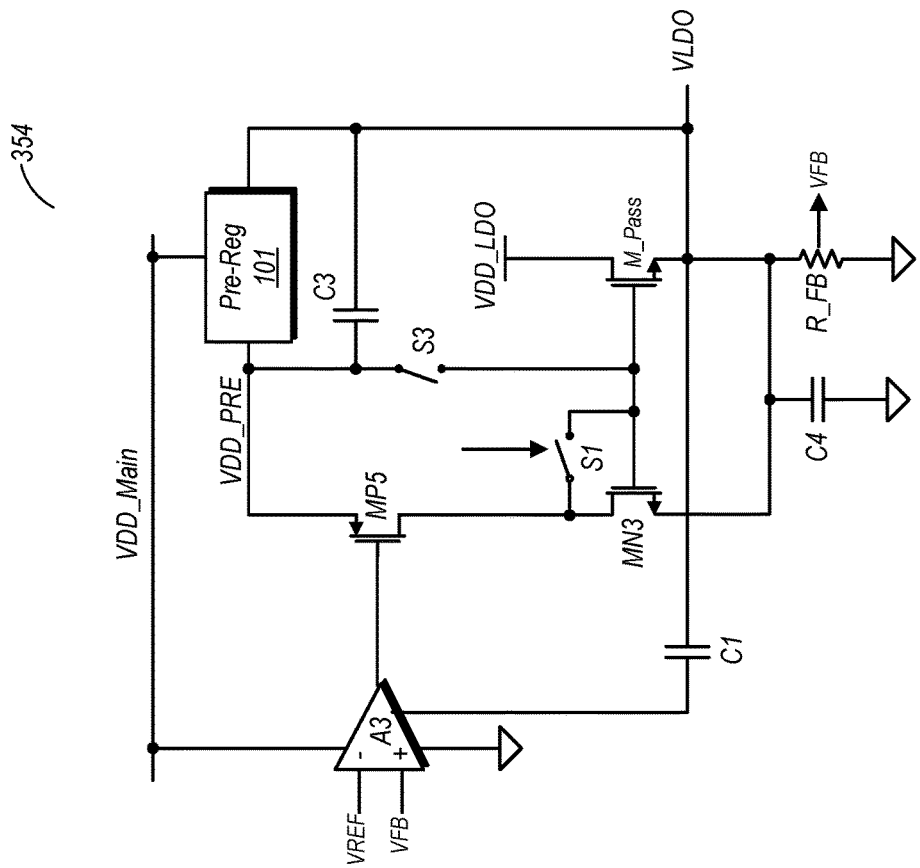
FIG. 8 is a schematic diagram of one embodiment of a voltage regulator having a pre-regulator circuit.

Turning now to FIG. 8, another embodiment of a voltage regulator. This embodiment also includes the main components of the three previous embodiments, namely an amplifier A3, a current buffer (which includes a current mirror) and a pre-regulator circuit 101. In this embodiment, the source terminals of MN3 and M_Pass (of the current mirror) are directly connected to one another. The embodiment shown also includes a filter capacitor C4 coupled in parallel with the feedback resistance R_FB.

The connecting of the source terminals of MN3 and M_Pass directly together guarantees that the gate-source voltage, Vgs, is the same for both of these devices. Accordingly, there is a direct relationship between the LDO output current and the current provided by the current buffer. Moreover, the output current in this embodiment is relatively stable and well-defined, and thus the circuit shown here may suitable for applications not requiring a rapid response to changing load demands.

Figure 9:
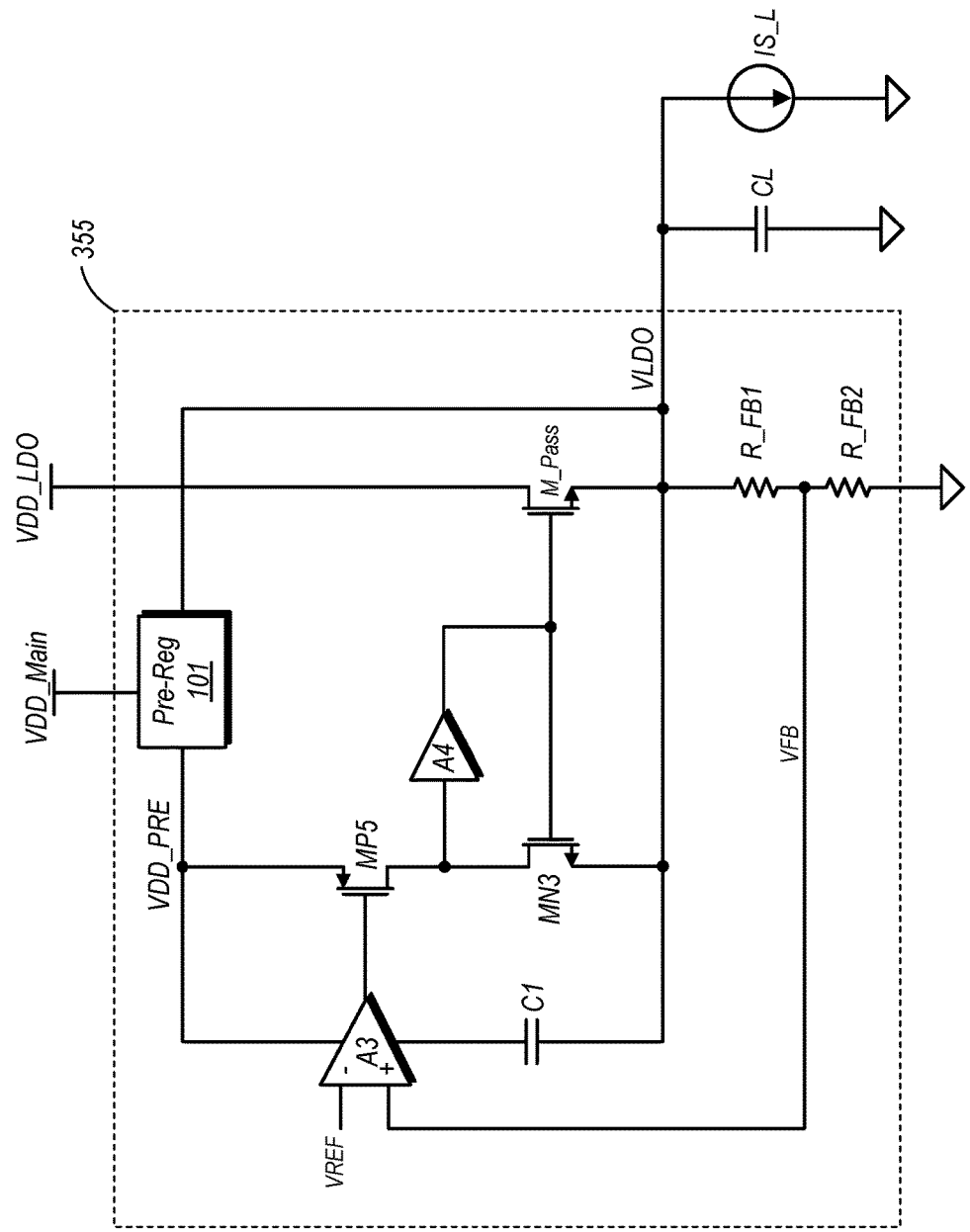
FIG. 9 is a schematic diagram of one embodiment of a voltage regulator having a pre-regulator circuit.

FIG. 9 introduces another voltage regulator embodiment. In this embodiment, the current buffer of voltage regulator 355 includes a single-ended amplifier A4 coupled between the drain terminal of MN3 and the gate terminals of both MN3 and M_Pass. Additionally, the error amplifier A3 is coupled to receive the supply voltage VDD_PRE from pre-regulator 101. A resistor voltage ladder including resistors R_FB1 and R_FB2 as shown here generates the feedback voltage, VFB. FIG. 9 also shows a load capacitor CL and a load current source IS_L, which are representative of the capacitance of the load circuit and the current drawn by the same. Embodiments of this voltage regulator in which pre-regulator 101 is replaced by a charge pump are possible and contemplated.

Both of amplifiers A3 and A4 in the embodiment shown are voltage amplifiers. In this embodiment, a dominant pole of the circuit is at the LDO output. The output of amplifier A3 and the gate terminal of M_Pass include non-dominant poles. Compensation capacitor C1 has the effect of moving the pole at the output of A3 to a higher frequency. Meanwhile, amplifier A4 in this arrangement has the effect of moving the pole at the gate of M_Pass to a higher frequency. This in turn improves stability of voltage regulator 355. Additionally, the arrangement of A4 in this embodiment provides a charging and discharging path for the gate of M_Pass, which can enhance the transient response of this circuit.

Figure 10:
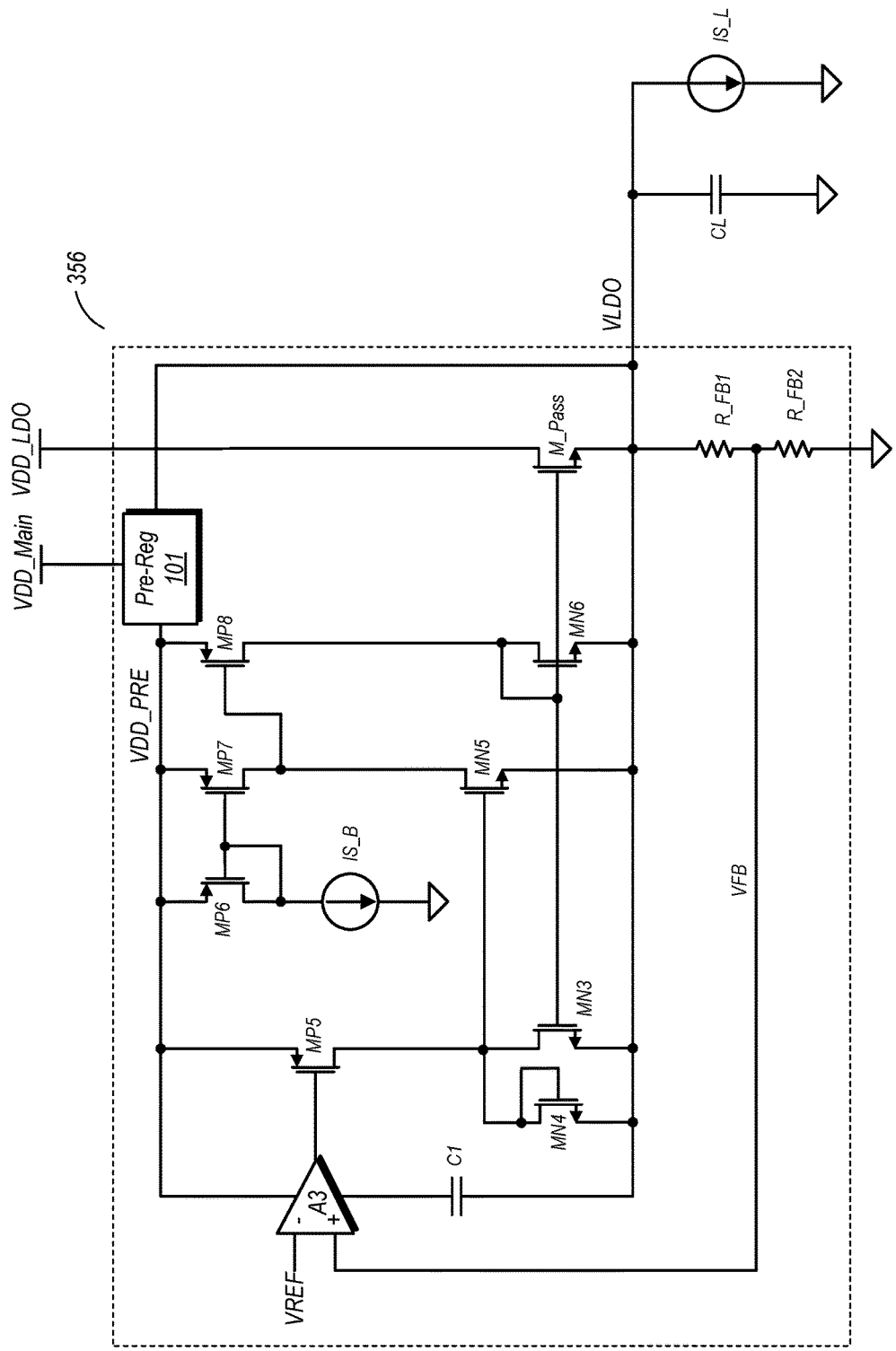
FIG. 10 is a schematic diagram of one embodiment of a voltage regulator having a pre-regulator circuit.

FIG. 10 illustrates a more detailed version of voltage regulator of FIG. 9, with one implementation of amplifier A2. Transistors MN4, MP6, MP7, MP8, MN5 and MN6 of voltage regulator 356 are the devices/circuitry that forms amplifier A2 as shown in FIG. 9. The current source IS_B as shown here is representative of a bias current through the diode-connected device MP6. Transistors MN4 and MN6 are diode-connected as well. Transistors MP6 and MP7 in the embodiment shown form a current mirror. Transistors MN3, MN4, and MN6 are significantly smaller devices than the pass transistor, M_Pass (e.g., on the order of 10,000 times smaller in one embodiment), and generate a current proportional to the current through M_Pass.

Figure 11:
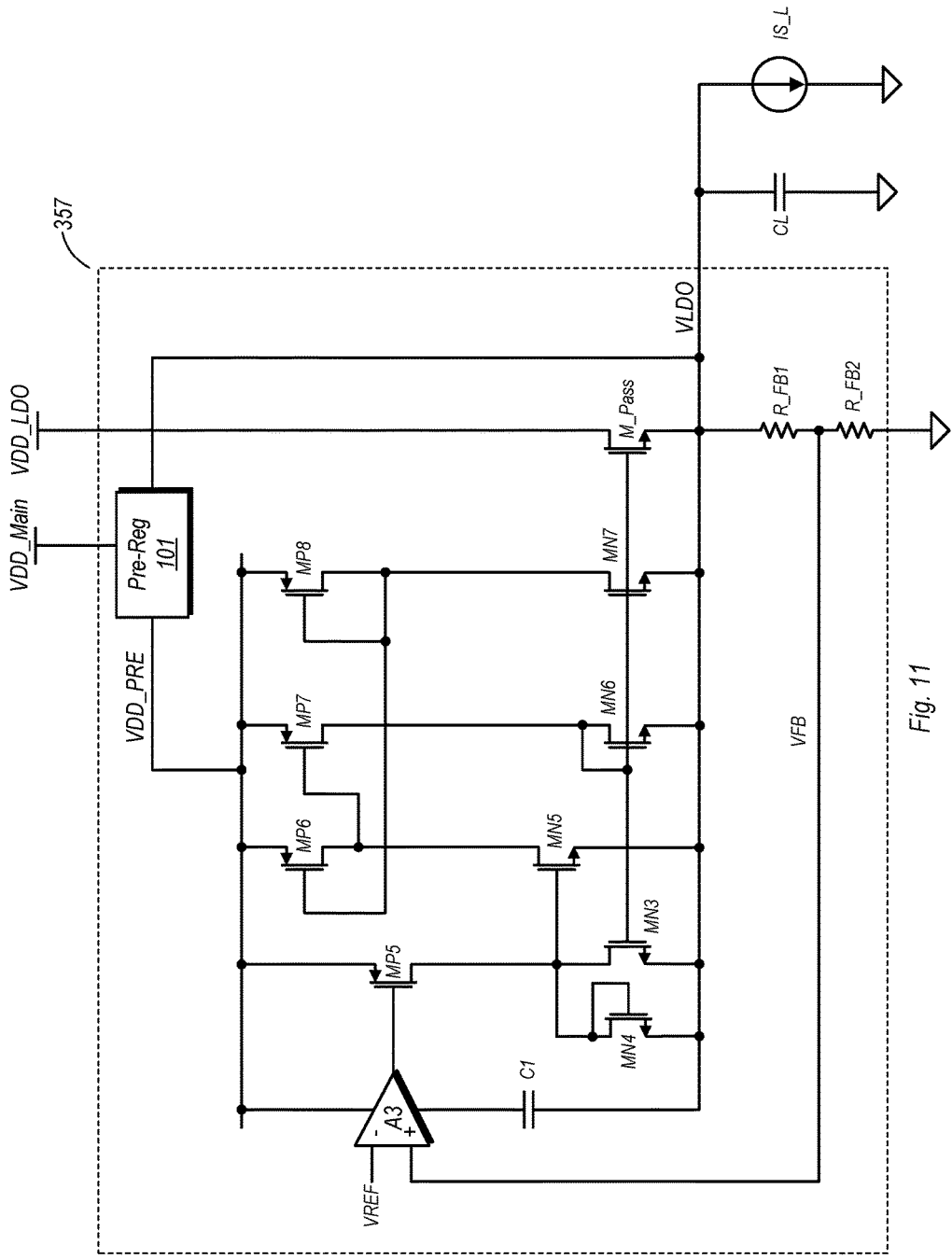
FIG. 11 is a schematic diagram of one embodiment of a voltage regulator having a pre-regulator circuit.

Another embodiment of a voltage regulator using an amplifier equivalent to A4 of FIG. 9 is shown in FIG. 11. In this particular embodiment, amplifier A4 includes transistors MN4, MN5, MN6 (which is diode connected), MN7, MP6, MP7, and MP8. Transistors MP8 and MN7 in this embodiment generate a bias current, similar to the bias current represented by IS_B of FIG. 10. The current through MN7 is proportional to the current through M_Pass. Furthermore, the current through MP8 (and MN7) is mirrored through MP6. The amplifier output is provided through the diode connection across MN6, to the gate of M_Pass.

FIG. 12 is a schematic diagram of one embodiment of an error amplifier that may be used in various embodiments of a voltage regulator, such as those shown in the previous three figures. In the embodiment shown, the feedback voltage VFB is provided to the gate of MP11, which is the non-inverting input. The reference voltage, VREF, is provided to the gate of MP12, which is the inverting input. The drains of MP11 and MP12 are coupled to the source terminals of MN11 and MN12, respectively, as well as the drain terminals of MN13 and MN14, respectively. The amplifier further includes a current mirror including MP14 and diode coupled device MP13. A first bias voltage, VB1, is applied to the gate terminals of MN11 and MN12, while a second bias voltage is applied to the gate terminals of MN13 and MN14. These bias voltage may be generated by various other voltage generation circuits that are external to amplifier A3. IS_B11 is representative of a bias current provided to the input devices MP11 and MP12.

Amplifier A3 in the embodiment shown is powered by the pre-regulator supply voltage, VDD_PRE. Additionally, the connection of capacitor C1 (coupled between internal circuitry of the amplifier and the output node of a voltage regulator embodiment (VLDO) is shown. The amplifier output node in this embodiment is taken from the junction of the drain terminals of MP14 and MN12. The voltage of the output signal provided on the amplifier output in A3 is dependent upon the difference between the input voltages, VFB and VREF, which is reflected by the difference between the gate-source voltages of MN11 and MN12.

The various voltage regulator embodiments may provide a number of advantages. Without providing any extra sensing circuits, the current buffers of the various embodiments discussed above may change their respective output impedances with the load, which in turn naturally moves the pole at the gate of the pass device when the demand on the load is higher (e.g., higher current demand). The current buffer also acts as a current gain stage while keeping the voltage gain low, which can result in significant improvements of the transient response of the regulator without compromising stability.

The use of a dynamic pre-regulator as in the embodiments discussed above prevents the low voltage devices from being damaged. This can be important if a low voltage device is used as the pass device in order to save chip area, or a low voltage device is used to reduce current through the current buffer. Use of the dynamic pre-regulator can also eliminate the need for clamping circuits, which can in some cases cause reliability issues. Furthermore, since the use of low voltage (and thus physically smaller) devices is enabled by use of the pre-regulator, chip area may be significantly reduced relative to other high current LDO voltage regulators.

The control path of the various embodiments discussed herein includes a single loop, which may simplify compensation relative to multiple-path control loops that may be used in high current LDO voltage regulators.

Unlike source follower buffered LDO voltage regulators, compensation of the voltage regulator embodiments disclosed herein can be enhanced through the compensation capacitor since the flexible gain is introduced between the error amplifier output and voltage regulator output. This configuration can be compensated with the dominant pole either internal or external as needed. If an internal dominant pole method is used (e.g., to meet large current transient response), a current mirror gain of 1:K may need be implemented by multiple stages to prevent high frequency current mirror pole moving low. Multiple-stage current gain stages prefer to have a gain difference over ten to prevent high frequency poles close to each other and potential high frequency peaking can be avoided.

Method of Operation and Exemplary System

Figure 13:
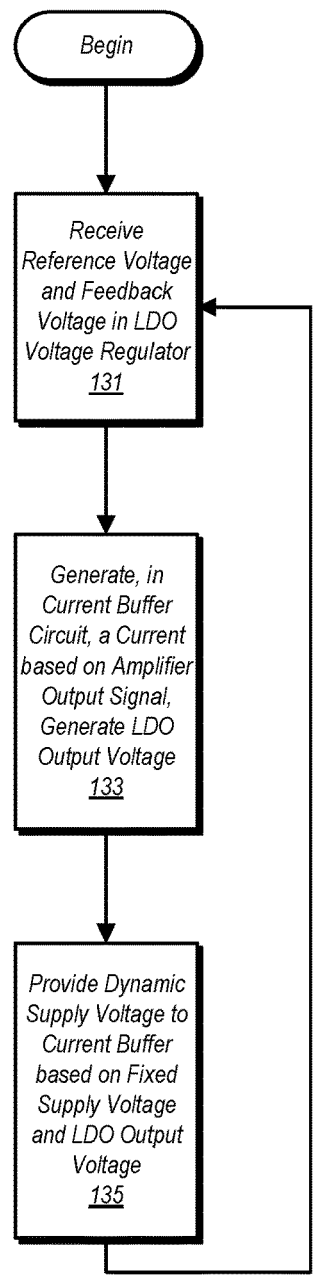
FIG. 13 is a flow diagram illustrating one embodiment of a method for operating a voltage regulator having a pre-regulator circuit.

FIG. 13 is a flow diagram of one embodiment of a method for operating a voltage regulator having a pre-regulator. Method 130 as shown here may be carried out by any of the voltage regulator embodiments discussed above, as well as variations thereof that are not explicitly discussed here.

Method 130 is a closed loop that includes the receiving of a reference voltage and a feedback voltage at respective inputs of an error amplifier in an LDO voltage regulator (block 131). The method further includes generating, in a current buffer, a current based on the error amplifier output voltage, and thus generate an LDO regulator output voltage (block 133). The output voltage is fed back to a pre-regulator circuit, which is also coupled to receive fixed supply voltage from an external (with respect to the regulator) supply. The pre-regulator provides a dynamic supply voltage to the current buffer based on the fixed supply voltage and the LDO output voltage (block 135).

Figure 14:
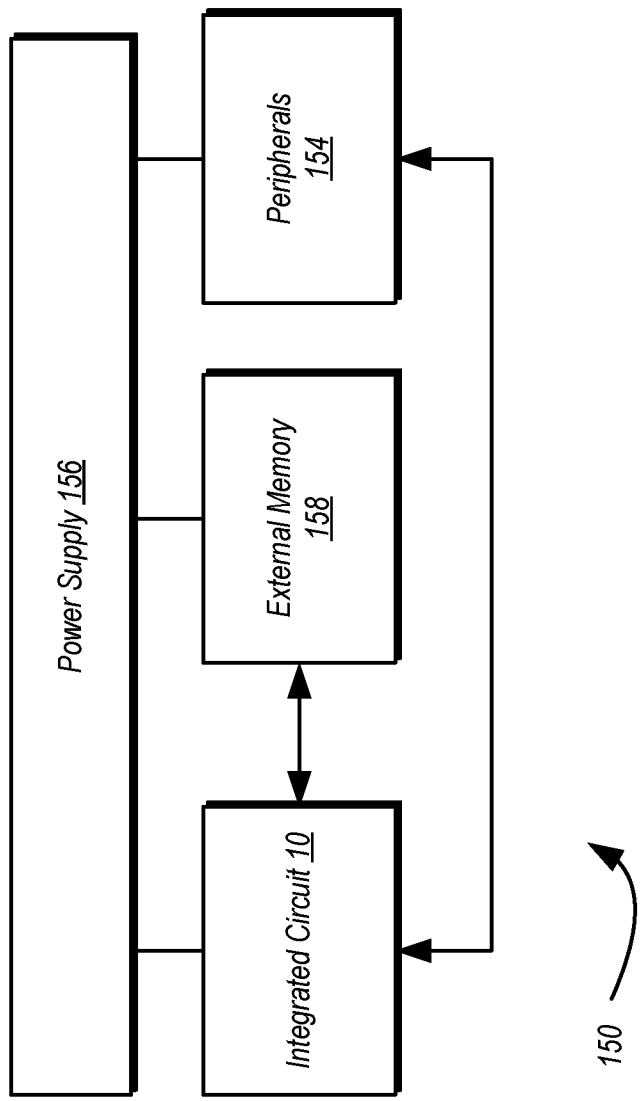
FIG. 14 is a block diagram of one embodiment of an example system.

Turning next to FIG. 14, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. A circuit comprising:
   a low dropout (LDO) voltage regulator, wherein the LDO voltage regulator includes:
      an amplifier circuit configured to receive a reference voltage from an external source and a feedback voltage;
      a current buffer comprising a first transistor having a gate terminal coupled to an output of the amplifier circuit, and a current mirror, wherein the current buffer is configured to provide a current based at least in part on an output signal generated by the amplifier circuit; and
      a pre-regulator circuit configured to provide a dynamic supply voltage to the current buffer circuit, wherein the dynamic supply voltage is at least partly dependent on a fixed supply voltage and partly dependent on an output voltage provided by the LDO voltage regulator.

2. The circuit as recited in claim 1, wherein the pre-regulator circuit includes:
   a first current source coupled to a first supply voltage node; and
   a first driver circuit having an input coupled to the first current source.

3. The circuit as recited in claim 2, wherein the pre-regulator circuit further includes a first resistor coupled between the input of the first driver circuit and a second supply voltage node.

4. The circuit as recited in claim 3, wherein the pre-regulator circuit further includes:

a first amplifier having an inverting input and a non-inverting input, wherein the non-inverting input is coupled to receive the output voltage provided by the LDO voltage regulator;
   a second transistor having a gate terminal coupled to an output of the first amplifier and a source terminal coupled to the inverting input of the first amplifier; and
   a second resistor coupled between the source terminal of the second transistor and the second supply voltage node.

5. The circuit as recited in claim 4, further comprising:
   a second current source coupled to a first supply voltage node;
   a second amplifier having an inverting input and a non-inverting input, wherein the non-inverting input of the second amplifier is coupled to receive the output voltage provided by the LDO voltage regulator;
   a third transistor having a gate terminal coupled to an output of the second amplifier and a source terminal coupled to the inverting input of the second amplifier; and
   a third resistor coupled between the source terminal of the third transistor and the second supply voltage node.

6. The circuit as recited in claim 2, wherein the pre-regulator circuit further includes:
   a first resistor having a first terminal coupled to the input of the first driver circuit; and
   a second current source coupled between a second terminal of the first resistor and a second supply voltage node.

7. The circuit as recited in claim 6, wherein the pre-regulator circuit further includes:
   a unity gain amplifier having an output coupled to a junction of the first resistor and the second current source;
   a second transistor having a source terminal coupled to a third voltage supply node and a drain terminal coupled to an input of the unity gain amplifier; and
   a capacitor coupled between the drain terminal of the second transistor and the second supply voltage node.

8. The circuit as recited in claim 1, wherein the LDO voltage regulator includes an output node coupled to convey the output voltage to a load circuit, wherein the output node is coupled to the pre-regulator circuit, and wherein the LDO voltage regulator further includes a resistance coupled between the output node and a reference node.

9. The circuit as recited in claim 8, wherein the LDO voltage regulator is configured to generate the feedback voltage based in part on the resistance.

10. The circuit as recited in claim 1, wherein the amplifier circuit includes an inverting input coupled to receive the reference voltage and a non-inverting input coupled to receive the feedback voltage.

11. A method comprising:
    receiving, in an amplifier of a low dropout (LDO) voltage regulator, a reference voltage from an external source, and a feedback voltage;
    a current buffer providing a current based at least in part on an output signal generated by the amplifier, wherein an output voltage provided by the LDO voltage regulator is at least partly dependent on the current provided by the current buffer; and
    a pre-regulator circuit providing a dynamic supply voltage to the current buffer wherein the dynamic supply voltage is at least partly dependent on a fixed supply voltage and partly dependent on an output voltage provided by the LDO voltage regulator.

12. The method as recited in claim 11 further comprising:
a first current source of the pre-regulator circuit generating a first current; and
a driver circuit generating the dynamic supply voltage based in part on the first current generated by the first current source.

13. The method as recited in claim 12, further comprising:
a second current source of the pre-regulator circuit generating a second current; and
the driver circuit generating the dynamic supply voltage based in part on the first and second current generated by the first and second current sources, respectively.

14. The method as recited in claim 11, further comprising:
generating the feedback voltage based on the output voltage and a resistance coupled between a reference node and an output node of the LDO voltage regulator.

15. An integrated circuit comprising:
a load circuit;
a low dropout (LDO) voltage regulator coupled to provide an operating voltage to the load circuit, wherein the LDO voltage regulator includes:
an amplifier circuit having an inverting input and a non-inverting input;
a current buffer circuit configured to provide a current based at least in part on an output signal generated by the amplifier circuit; and
a pre-regulator circuit configured to provide a dynamic supply voltage to the current buffer circuit, wherein the dynamic supply voltage is at least partly dependent on a fixed supply voltage and partly dependent on an output voltage provided by the LDO voltage regulator.

16. The integrated circuit as recited in claim 15, wherein the pre-regulator circuit includes:
a first current source coupled to a first supply voltage node; and
a first driver circuit having an input coupled to the first current source.

17. The integrated circuit as recited in claim 16, wherein the pre-regulator circuit further includes a first resistor coupled between the input of the first driver circuit and a second supply voltage node.

18. The integrated circuit as recited in claim 17, wherein the pre-regulator circuit further includes:
a first amplifier having an inverting input and a non-inverting input, wherein the non-inverting input is coupled to receive the output voltage provided by the LDO voltage regulator;
a first transistor having a gate terminal coupled to an output of the first amplifier and a source terminal coupled to the inverting input of the first amplifier; and
a second resistor coupled between the source terminal of the first transistor and the second supply voltage node.

19. The integrated circuit as recited in claim 18, wherein the pre-regulator circuit further includes:
a second current source coupled to a first supply voltage node;
a second amplifier having an inverting input and a non-inverting input, wherein the non-inverting input of the second amplifier is coupled to receive the output voltage provided by the LDO voltage regulator;
a second transistor having a gate terminal coupled to an output of the second amplifier and a source terminal coupled to the inverting input of the second amplifier; and
a third transistor coupled between the source terminal of the third transistor and the second supply voltage node.

20. The integrated circuit as recited in claim 16, wherein the pre-regulator circuit further includes:
a first resistor having a first terminal coupled to the input of the first driver circuit;
a second current source coupled between a second terminal of the first resistor and a second supply voltage node;
a unity gain amplifier having an output coupled to a junction of the first resistor and the second current source;
a first transistor having a source terminal coupled to a third voltage supply node and a drain terminal coupled to an input of the unity gain amplifier; and
a capacitor coupled between the drain terminal of the first transistor and the second supply voltage node.

* * * * *